UNITED STATES PATENT OFFICE.

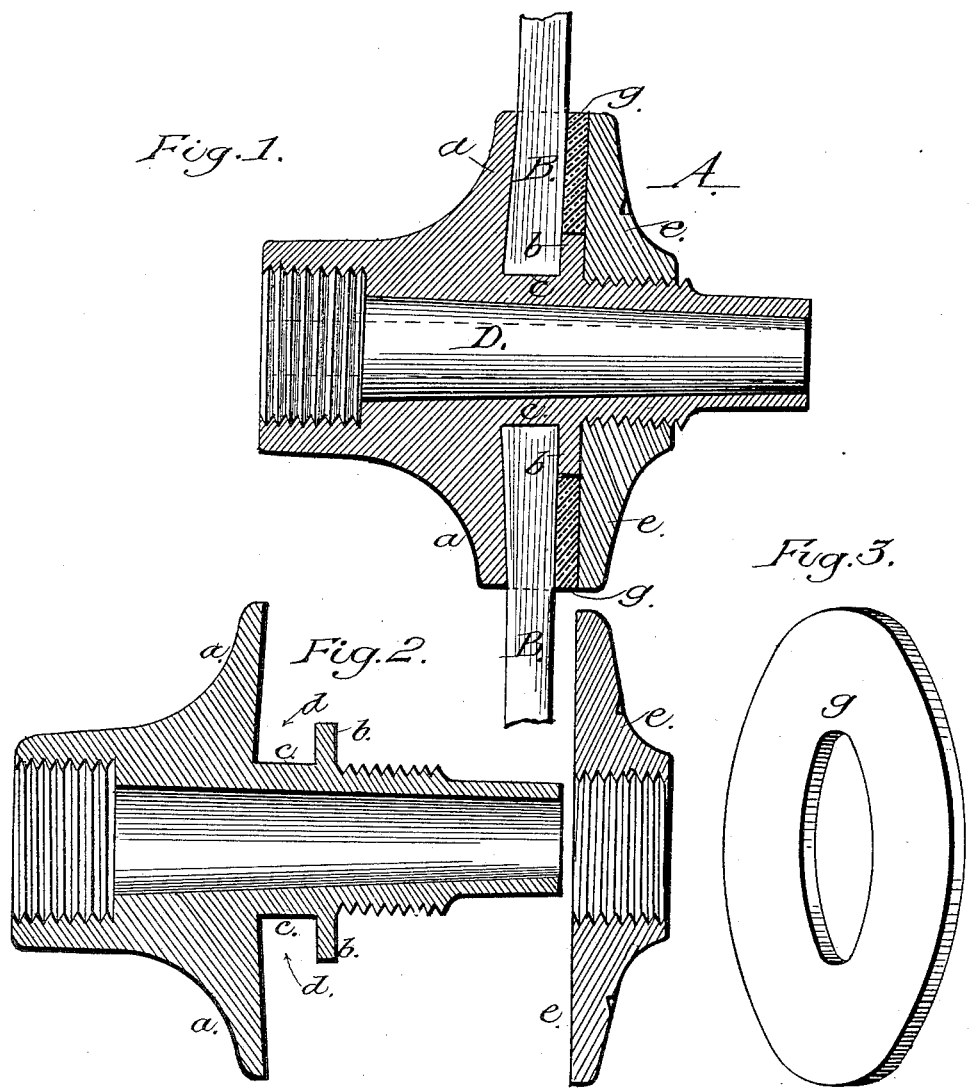

MILTON BROWN SOUTHERLAND, OF EAST PERRYVILLE, TENNESSEE, ASSIGNOR OF ONE-HALF TO JAMES R. BLOUNT, OF SAME PLACE.

VEHICLE-HUB.

SPECIFICATION forming part of Letters Patent No. 399,577, dated March 12, 1889.

Application filed July 11, 1888. Serial No. 279,634. (No model.)

*To all whom it may concern:*

Be it known that I, MILTON BROWN SOUTHERLAND, a citizen of the United States, residing at East Perryville, in the county of Perry and State of Tennessee, have invented certain new and useful Improvements in Vehicle-Wheels, of which the following is a full, clear, and exact description, reference being had to the accompanying drawings, forming part of this specification, in which—

Figure 1 represents a longitudinal sectional view of a vehicle-wheel embodying my improvements. Figs. 2 and 3 illustrate the several parts of the wheel detached.

My invention relates to vehicle-wheels, and especially to that class possessing metallic hubs; and it consists in the peculiar constructions and combinations of parts, which I shall hereinafter fully describe and claim.

To enable others skilled in the art to which my invention appertains to make and use the same, I will now describe its construction and indicate the manner in which the same is carried out.

In the said drawings, A represents the hub of the wheel cast in two sections, one section having integrally formed therewith an exterior flange, $a$, an interior collar, $b$, and a sleeve, $c$, as shown in Fig. 2, the said sleeve, in conjunction with the exterior flange and interior collar, forming an annular channel or groove, $d$, within which the bases of the spokes B are suitably seated, the said spokes being of any desired form, with their outer ends united by the usual fellies and tire.

The sleeve $c$ receives the boxing D, through which the axle passes, and the flange $a$ is cored and threaded at one end to engage the threads on the end of the boxing, whereby the latter is retained in position, but is readily removable when worn or unfit for use.

The sleeve $c$, as before stated, forms an integral portion of the flange and collar, extends outwardly from the latter, and is externally threaded to receive a flange, $e$, which is screwed thereon, the two flanges $a$ and $e$ forming the completed hub, and, if desired, may be suitably embellished.

The inner face of the flange $a$ is concaved, whereby said flange may be caused to come squarely against the spokes, and the exterior face of the flange $e$ is provided with means for the engagement of a wrench to facilitate its application or removal.

Between the inner face of the flange $e$ and the contiguous side of the spokes is fitted a packing-ring, $g$, which fits over the collar $b$ and is tightly forced against said spokes when the flange $e$ is screwed up, thereby greatly assisting in holding the spokes against displacement.

In setting up my wheel the spokes are first driven into the annular groove or channel between the inner faces of the flange $a$ and collar $b$, with their lower ends or bases resting upon that portion of the sleeve $c$ contiguous thereto. The elastic packing-ring is then slipped over the collar $b$, and the other flange, $e$, screwed upon the threaded end of the sleeve until the collar enters the concaved or depressed portion therein, and the packing-ring is pressed tightly against the sides of the spokes when the wheel is complete, it being understood that the fellies and boxing are applied in the usual manner and the tire shrunk on the fellies in any well-known way.

A wheel constructed as herein described is more durable than many of the wheels at present constructed, the several component parts being secured in position without the application of rivets, bolts, or screws.

Having thus described my invention, what I claim as new, and desire to secure by Letters Patent, is—

1. In a vehicle-wheel, the combination, with the spokes and fellies, of the metallic hub consisting of the flange $a$, the collar $b$, forming between itself and said flange an annular groove or channel for the spokes, a sleeve integrally formed with said flange and collar, and a second flange adapted to be screwed upon said sleeve, substantially as described.

2. In a vehicle-wheel, a metallic hub comprising a flange, a contiguous collar, and an externally-threaded sleeve, said flange, collar, and sleeve formed in one piece, in combination with a removable flange, $e$, adapted to be screwed upon said sleeve, and a packing-ring between said flange and the sides of the spokes, substantially as herein described.

3. An improved vehicle-wheel, comprising spokes and fellies, a metallic hub formed in two sections, one section consisting of an integral exterior flange, interior collar, and threaded sleeve, and the other section consisting of an external removable flange adapted to be screwed upon said sleeve, a packing-ring over said collar and between the inner face of the removable flange and the spokes, and a boxing in said sleeve screwed within the core of the fixed flange, substantially as described.

MILTON BROWN SOUTHERLAND.

Witnesses:
R. A. KIMBEL,
G. W. PEARSON.